J. H. MYERS.
HARVESTER-RAKE.
No. 190,778.
Patented May 15, 1877.
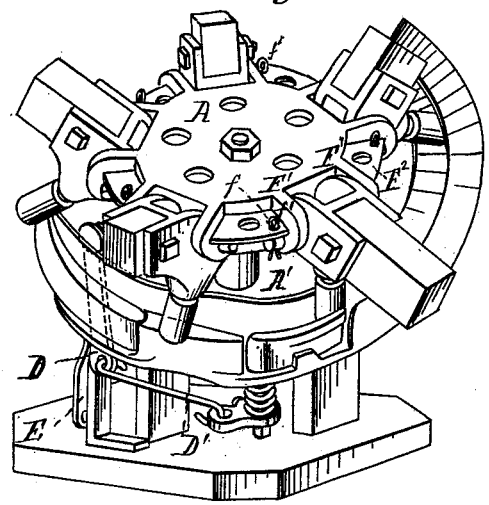
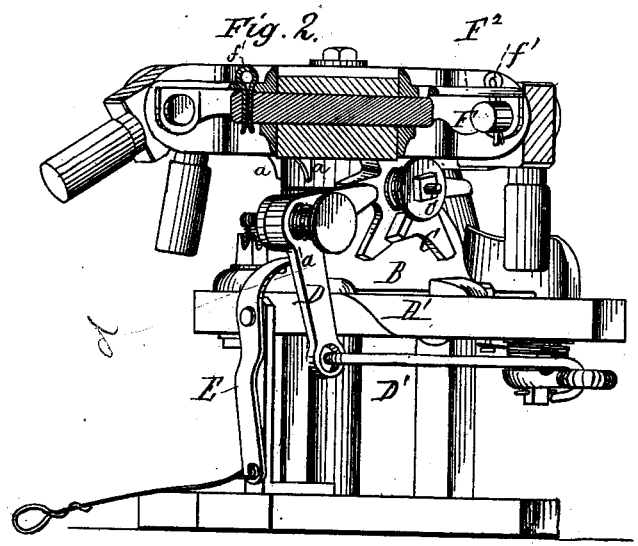
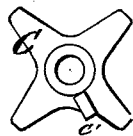
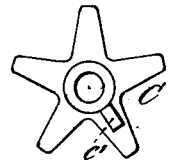
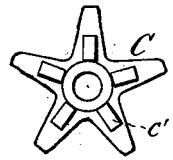
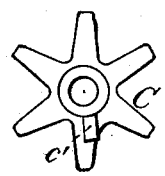
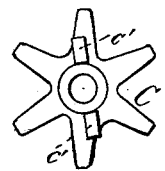
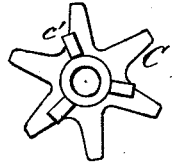
Witnesses:
Alexander Mahon
John D. Center
Inventor:
Jacob H. Myers.
by A. M. Smith
Attorney
N. PETERS, PHOTO-LITHOGRAPHER, WASHINGTON, D. C.

UNITED STATES PATENT OFFICE.

JACOB H. MYERS, OF ROCHESTER, NEW YORK.

IMPROVEMENT IN HARVESTER-RAKES.

Specification forming part of Letters Patent No. 190,778, dated May 15, 1877; application filed May 20, 1876.

*To all whom it may concern:*

Be it known that I, JACOB H. MYERS, of Rochester, county of Monroe, State of New York, have invented certain new and useful Improvements in Harvester-Rakes, of which the following is a full, clear, and exact description, reference being had to the accompanying drawings, making part of this specification, in which—

Figure 1 represents a perspective view of so much of a rake-head and standard as is necessary to show my improvements. Fig. 2 is a side view of the same, and Figs. 3, 4, 5, 6. 7, and 8 represent the different star-wheels employed for operating the switch.

My invention consists in the employment of a series of differential star-wheels, any one of which may be used, and locating the tripping spur or spurs upon the side of said wheel for permitting said spur to act directly upon the lever which opens the switch; second, in the manner of driving the star-wheel by means of radial webs or downwardly-projecting flanges, located upon the under side of the rake-head, said webs or flanges corresponding in number to the number of rake and reel arms employed; third, to a novel manner of securing the rake and reel arms to the head; and, lastly, in certain details of construction hereinafter explained.

The rake and reel standard, as also the head, being similar in construction to those in general use, need not be particularly described, except so far as is necessary to illustrate my improvements. The head A is provided with sockets for the reception of five rake and reel arms, and the lower face of this head is provided with five radial webs or downwardly-projecting flanges, $a$, equal to the number of rake and reel arms. Upon the standard A', underneath the head, and in close proximity to the pivot of the head A, is located a standard, B, and to this standard the star-wheels C are connected through a short pin or axle, $c$, bringing the points of said star-wheels in such relation to the under side of the rake-head as that, when the rake-head A is rotated, the downwardly-projecting flanges or webs $a$ come in contact with said points, and rotate the wheel continuously, and by means of the spur or spurs $c'$, located upon the side of the star-wheels, and which actuates the switch-lever, a positive movement is given to said switch. D is the bell-crank lever, mounted upon the standard B, one end of which is extended inward nearly to the center of the star-wheel, so as to be operated by the spur or spurs $c'$. The other end, extending downward, is connected, through a rod or link, D', to an arm or lever, which operates the switch. The switch arm or standard is connected with any preferred construction of retracting-spring for forcing the switch back into position when its actuating-lever is released by the spur. The lever D is mounted upon a shaft or axle, $d$, cast or otherwise secured to the standard B, and of such length as to permit the lever to slide thereon, for permitting it to be thrown out of engagement with the tripping-spur upon the star-wheels, but is held in place by means of a spring, surrounding said axle $d$, and held thereon by means of a washer, mounted upon a bolt or pin, passing through the axle, and secured upon the inner face of the standard B by means of a nut. E is the shifting-lever, for throwing the bell-crank lever out of engagement, pivoted at any convenient point near the bell-crank lever, and upon the rake-standard or track. By the employment of the interchangeable star-wheels, each having a different number of points and spurs, an automatic delivery of the gavel may be effected to suit the condition of the crop—that is, every second, third, fourth, fifth, and sixth arm may be made to act as a rake, as required—and by using a star-wheel having a number of points and spurs equal to the number of rake and reel arms employed, the grain will be delivered in a continuous swath.

By means of the last-named star-wheel the driver is also enabled to regulate or control the size of the gavel at will by holding the bell-crank lever out of action or contact with the spurs through the shifting-lever E, which is operated through a cord or wire, extended to within convenient reach of the driver, thereby causing all of the arms to act as beaters until it is desired to deliver a gavel, when, by releasing the cord or wire, the bell-crank lever is instantly forced back by its spring in position to be acted upon by the star-wheel for operating the switch, and causing the succeeding arm to act as a rake. By the same means the driver can control the delivery of the gavels, to keep them out of the way at corners when using any one of the star-wheels.

The cord or wire may be operated by any usual or preferred arrangement of hand-lever or treadle.

If desired, the series of star-wheels may be mounted upon a revolving disk or sleeve, or upon a horizontal slide, and the one desired for use brought into proper position to be acted upon by the revolving rake-head. By the construction and arrangement shown and described, the points of the star-wheels may be made all of the same length, and the intervening spaces of uniform depth, the tripping or opening of the switch being effected by a positive movement through the spur or spurs on the sides of said wheels. In some cases, instead of locating the tripping-spurs on the side of the star-wheels, it may be found desirable to extend one or more of the star points or teeth, and to so locate the arm of the bell-crank lever as to be acted upon by such extended arm. This may be done without changing the depth of the notch between the star-points, or, rather, the distance of the bottom thereof from the axial center of the star-wheel.

By the use of the differential star-wheels, instead of ordinary spur-gears, the wheels may be made of uniform diameter, and they can, consequently, be substituted one for another, for changing the frequency of the raking action without changing the relation of the star-wheel shaft to the rake-head or its shaft, whereas, in the employment of spur-gearing, gears of different diameters must be employed, necessitating an adjustment of the tripping-wheel and rake-shafts, one relatively to the other, to accommodate this variation in the diameters of the gears, and this adjustment, unless made with great care and precision, is liable either to cause the teeth to mesh too snugly, and thereby to bind and greatly increase the friction, or too loosely, rendering the teeth or cogs liable to rattle, and to back action, and frequently to be broken, all of which difficulty is obviated by the employment of the interchangeable star-wheels.

The manner of securing the rake and reel arm to the head is as follows: F is a pin, which secures the rake and reel arms in position, said pin having its bearings in the flanges $F^1$, forming the socket for said rake and reel arms. Upon each side of these flanges, and in the web $F^2$ connecting them, is formed a pin or key hole, $f$, through which a spring-key, $f'$, is inserted, as also through the hole in the end of the pin F. Instead of forming the key-hole in the web $F^2$, lugs or ears may be cast upon the side of the flanges $F^1$, for holding the pin $f'$ in position. It will be seen that by this construction the pin F is prevented from rotating, and forms a long bearing for the rake and reel arms, whereas the pin F secured in the usual way turns with the rake and reel arm, and causes the wear to fall on the short bearings of the flanges $F^1$. This manner of securing also permits the use of a pin without a head, thereby permitting it to be cut from a straight rod.

Having now described my invention, what I claim as new, and desire to secure by Letters Patent, is—

1. A series of differential interchangeable star-wheels, provided with tripping-spurs adapted to act directly on the switch-gate lever for controlling the cam-switch and the path of the rake and reel arms, as described.

2. The combination, with the rake-cam switch or gate, of a star-wheel, having two or more tripping-spurs for giving a direct positive movement to said cam-switch or gate, and controlling the path of the rake and reel arms, as described.

3. The arrangement of the star tripping wheel or wheels, in combination with the rotating rake-head, whereby said tripping-wheels are adapted to be operated directly by the rake-head without the interposition of gearing.

4. The rake-head, provided with radial webs or flanges, in combination with the wheel or wheels for tripping the rake-cam switch or gate, as described.

5. The pin which unites the rake and reel arm with the rotating rake-head, in combination with the key for holding the pin stationary relatively to said rake-head, substantially as and for the purpose set forth.

JACOB H. MYERS.

Witnesses:
ALEX. THACKARA,
S. W. THACKARA.